United States Patent
Martín et al.

(10) Patent No.: US 12,154,012 B2
(45) Date of Patent: Nov. 26, 2024

(54) SYSTEMS AND METHODS FOR LIGHTWEIGHT CLOUD-BASED MACHINE LEARNING MODEL SERVICE

(71) Applicant: OPEN TEXT SA ULC, Halifax (CA)

(72) Inventors: Carles Bayés Martín, Sant Just Desvern (ES); Marc Rodriguez Sierra, Sant Just Desvern (ES); Sumitra Sahu, Hyderabad (IN); Jalendhar Baddam, Hyderabad (IN)

(73) Assignee: OPEN TEXT SA ULC, Halifax (CA)

( * ) Notice: Subject to any disclaimer, the term of this patent is extended or adjusted under 35 U.S.C. 154(b) by 1474 days.

(21) Appl. No.: 16/441,494

(22) Filed: Jun. 14, 2019

(65) Prior Publication Data
US 2020/0394566 A1    Dec. 17, 2020

(51) Int. Cl.
*G06N 20/20*    (2019.01)
*G06F 16/21*    (2019.01)
*G06N 5/04*    (2023.01)
*H04L 67/10*    (2022.01)

(52) U.S. Cl.
CPC .......... *G06N 20/20* (2019.01); *G06F 16/211* (2019.01); *G06N 5/04* (2013.01); *H04L 67/10* (2013.01)

(58) Field of Classification Search
CPC ........ G06N 20/20; G06N 5/04; G06F 16/211; H04L 67/10
See application file for complete search history.

(56) References Cited

U.S. PATENT DOCUMENTS

| | | | | |
|---|---|---|---|---|
| 10,650,928 | B1* | 5/2020 | Larson | G16H 40/67 |
| 2016/0160679 | A1* | 6/2016 | Griffiths | F01D 21/003 |
| | | | | 134/57 R |
| 2017/0220606 | A1* | 8/2017 | Wang | G06N 5/04 |
| 2018/0018590 | A1* | 1/2018 | Szeto | G16H 50/20 |
| 2018/0025272 | A1* | 1/2018 | Lin | G06N 3/063 |
| | | | | 706/25 |
| 2019/0042955 | A1* | 2/2019 | Cahill | G06N 5/04 |
| 2019/0057314 | A1* | 2/2019 | Julian | H04L 67/34 |

(Continued)

OTHER PUBLICATIONS

Yellavula, Building RESTful Web Services with Go: Learn how to build powerful RESTful APIs with Golang that scale gracefully, Packt Publishing Ltd, 2017, pp. 1-311 (Year: 2017).*

(Continued)

*Primary Examiner* — Omar F Fernandez Rivas
*Assistant Examiner* — Shamcy Alghazzy
(74) *Attorney, Agent, or Firm* — Sprinkle IP Law Group

(57) ABSTRACT

A lightweight machine learning model (MLM) microservice is hosted in a cloud computing environment suitable for large-scale data processing. A client system can utilize the MLM service to run a MLM on a dataset in the cloud computing environment. The MLM can be already developed, trained, and tested using any appropriate ML libraries on the client side or the server side. However, no data schema is required to be provided from the client side. Further, neither the MLM nor the dataset needs to be persisted on the server side. When a request to run a MLM is received by the MLM service from a client system, a data schema is inferred from a dataset provided with the MLM. The MLM is run on the dataset utilizing the inferred data schema to generate a prediction which is then returned by the MLM service to the client system.

20 Claims, 6 Drawing Sheets

(56) References Cited

U.S. PATENT DOCUMENTS

2019/0156245 A1* 5/2019 Jan .......................... H04L 67/10
2019/0311259 A1* 10/2019 Cricri ...................... G06N 3/08

OTHER PUBLICATIONS

Nickel, et al., A Review of Relational Machine Learning for Knowledge Graphs: From Multi-Relational Link Prediction to Automated Knowledge Graph Construction, arXiv:1503.00759v1 [stat. ML], Mar. 2, 2015, pp. 1-18 (Year: 2015).*
Alipour—Online machine learning for cloud resource provisioning of microservice backend systems (Year: 2017).*

* cited by examiner

SYSTEMS AND METHODS FOR LIGHTWEIGHT CLOUD-BASED MACHINE LEARNING MODEL SERVICE

TECHNICAL FIELD

This disclosure relates generally to the field of data processing. More particularly, this disclosure relates to systems, methods, and computer program products for a lightweight cloud-based machine learning model service for stateless machine learning model consumption of data and generation of prediction.

BACKGROUND OF THE RELATED ART

Machine learning is a branch of artificial intelligence that focuses on the ability of computerized machines to learn from data, identify patterns, and make decisions without preprogrammed rules. Different machine learning techniques can produce different machine learning models. For example, gradient boosting is a machine learning technique for machines to learn how to solve regression and classification problems. A machine learning model built utilizing gradient boosting can be an ensemble predictive statistical model. As another example, a machine learning model generated from training a neural network can refer to the artifacts created through the training process, such as the weights and biases of the neural network.

Generally, a machine learning model is built in a development environment (e.g., by a data scientist using a machine learning modeling application containing a machine learning library) and deployed to a target system (e.g., a machine learning server, a server application, etc.) in a production environment after training, validation, and testing. An example of a target system can be a machine learning server operating on a server machine in an enterprise computing environment or on a virtual machine in a cloud computing environment. Another example of a target system can be an intelligent application running on an artificial intelligence platform.

A typical deployment process can be as follows. A trained, validated, and tested machine learning model is packaged into a software package, for instance, as a container image. This packaging can be done using a computer program that performs operating-system-level virtualization ("containerization"). This container image can include the dependencies needed to run the machine learning model. The packaged machine learning model can then be deployed to a machine learning server described above.

In some cases, coding (e.g., in Python, C++, etc.) is required to deploy a machine learning model to a target system. This can include writing codes to create an image configuration, writing codes to create an image using the image configuration, writing codes to define a deployment configuration for deploying, etc. Manual coding is a time-consuming, tedious, and labor-intensive task and requires in-depth programming knowledge and knowledge of a target computer system to which the machine learning model is to be deployed.

Once deployed, the machine learning model resides on the machine learning server and is accessible by a web server or an application. For example, a user interface element of a web site hosted by the web server can invite a visitor to the web site to get a prediction on what will be the highest temperature for the month of July this year. When the user interface element is activated, it can cause the web server to POST a message to the machine learning model residing on the machine learning server using a request method supported by the Hypertext Transfer Protocol (HTTP). In response, the machine learning server retrieves the data needed by the machine learning model, runs the machine learning model to process the data, gets a prediction from the machine learning model, and returns the prediction back to the web server which, in turn, displays the prediction to the visitor of the web site.

SUMMARY OF THE DISCLOSURE

An object of the invention is to provide stateless machine learning model (MLM) consumption of data and generation of prediction based on the data. Another object of the invention is to eliminate the need to deploy MLMs to a server machine or to persist MLMs on the server machine. Yet another object of the invention is to provide a scalable solution for an artificial intelligent (AI) platform to run trained MLMs without having to increase the data storage capacity of the AI platform.

These and other objects of the invention can be realized in systems, methods, and computer program products for a lightweight cloud-based MLM service for stateless MLM consumption of data and generation of prediction. In computing, "stateless" is used to describe a communications protocol in which no session information is retained by a receiver (e.g., a server). HTTP is an example of a stateless protocol. The Internet Protocol (IP) is another example.

In some embodiments, a method can include providing a MLM service from a microservice framework operating in a cloud computing environment to a client system. The microservice framework can be part of an AI platform and have an execution engine for large-scale data processing on the AI platform. The microservice framework can further include a Representational State Transfer (REST) controller for handling application programming interface (API) calls. In some embodiments, the REST controller is configured to function as a stateless REST API for the AI platform.

The MLM service may receive, from the client system, a request to run a MLM with a dataset. The MLM can be developed, trained, validated, and/or tested using any suitable ML modeling tools and ML libraries available on the market today. As a non-limiting example, the MLM can be structured to implement an ensemble learning method, a random forest classifier, a meta estimator, a random decision forest, etc. The request contains and/or references the MLM and the dataset. The MLM service takes the MLM and the dataset and makes an API call to the stateless REST API of the AI platform.

In this case, both the MLM and the dataset are contained in the API call. As a non-limiting example, the dataset can be in the form of a file. However, the API call does not contain a data schema for the MLM. Generally, a data schema is a structured description of data organization. Thus, the MLM needs a data schema that describes how the dataset is organized in order to process the dataset.

Instead of requiring the client system to provide a data schema, the execution engine is operable to infer, from the dataset, a data schema for the MLM. In some embodiments, this can include constructing, from the dataset, a dataframe with named columns. The data schema can then be inferred from the named columns of the dataframe constructed from the dataset.

The MLM is then run on the AI platform in the cloud computing environment by the execution engine to process the dataset utilizing the data schema. Based on its previously learned knowledge, the MLM generates a prediction about the dataset. The prediction thus generated is returned to the client system by the MLM service. While the MLM can optionally be temporarily stored in a storage system (e.g., an in-memory storage, etc.) in the cloud computing environment, in a true stateless manner, neither the MLM nor the dataset is persisted on the AI platform.

One embodiment comprises a system comprising a processor and a non-transitory computer-readable storage medium that stores computer instructions translatable by the processor to perform a method substantially as described herein. Another embodiment comprises a computer program product having a non-transitory computer-readable storage medium that stores computer instructions translatable by a processor to perform a method substantially as described herein. Numerous other embodiments are also possible.

Embodiments disclosed herein can provide many advantages. For example, the MLM service is stateless and the statelessness can help in scaling APIs to millions of concurrent users (e.g., through multiple server machines in a cloud computing environment). Being stateless also reduces complexity because state synchronization logic is no longer needed on the server side and, correspondingly, the MLM service can be extremely light weight. Further, since persistent deployment is not required in a stateless approach, a MLM can be readily applied whenever desired. Yet, the stateless approach allows a client system to leverage the computational power and capabilities of an execution engine running on an AI platform to run a MLM remotely and promptly obtain a prediction from the MLM. On the client side, the MLM service disclosed herein can reduce the complexity and previously required MLM deployment actions down to an API call containing a MLM and data. On the server side, the MLM service disclosed herein can also reduce the complexity and previously required server resources down to an instance of an execution engine already capable of large-scale data processing.

These, and other, advantages and aspects of the disclosure will be better appreciated and understood when considered in conjunction with the following description and the accompanying drawings. It should be understood, however, that the following description, while indicating various embodiments of the disclosure and numerous specific details thereof, is given by way of illustration and not of limitation. Many substitutions, modifications, additions, and/or rearrangements may be made within the scope of the disclosure without departing from the spirit thereof, and the disclosure includes all such substitutions, modifications, additions, and/or rearrangements.

BRIEF DESCRIPTION OF THE DRAWINGS

The drawings accompanying and forming part of this specification are included to depict certain aspects of the invention. A clearer impression of the invention, and of the components and operation of systems provided with the invention, will become more readily apparent by referring to the exemplary, and therefore non-limiting, embodiments illustrated in the drawings, wherein identical reference numerals designate the same components. Note that the features illustrated in the drawings are not necessarily drawn to scale.

DETAILED DESCRIPTION

The invention and the various features and advantageous details thereof are explained more fully with reference to the non-limiting embodiments that are illustrated in the accompanying drawings and detailed in the following description. Descriptions of well-known starting materials, processing techniques, components, and equipment are omitted so as not to unnecessarily obscure the invention in detail. It should be understood, however, that the detailed description and the specific examples, while indicating some embodiments of the invention, are given by way of illustration only and not by way of limitation. Various substitutions, modifications, additions, and/or rearrangements within the spirit and/or scope of the underlying inventive concept will become apparent to those skilled in the art from this disclosure.

Today, many AI platforms provide users such as application developers with the necessary application development tools to build intelligent applications such as virtual assistant, self-driving cars, stock price prediction, etc. These applications are the consumers of results (e.g., predictions) produced by MLMs.

Likewise, there are many ML modeling tools and ML libraries for users such as data scientists to build/develop, validate, train, and test MLMs. AI platforms, application development tools, ML modeling tools, ML libraries, and MLMs are known to those skilled in the art and thus are not further described herein.

Generally, to run an MLM on an AI platform, the MLM must reside on the AI platform. If the MLM is not developed and trained on the AI platform, it must first be deployed to the AI platform and persisted, along with the data used by the MLM, on the AI platform. The AI platform can then make the MLM available for consumption by applications running on the AI platform. This process can be referred to as publication. When an MLM is published on an AI platform, a data schema used by the MLM is also published so that anyone who would like to use the MLM understands how to prepare data for the MLM in a way that will be recognized by the MLM. For example, if the MLM accepts comma-separated values (CSV) files, a CSV schema expressed in plain text would be published with the MLM. If the MLM accepts JavaScript Object Notation (JSON) files, a JSON schema expressed in a programming language would be published with the MLM.

Figure 1:
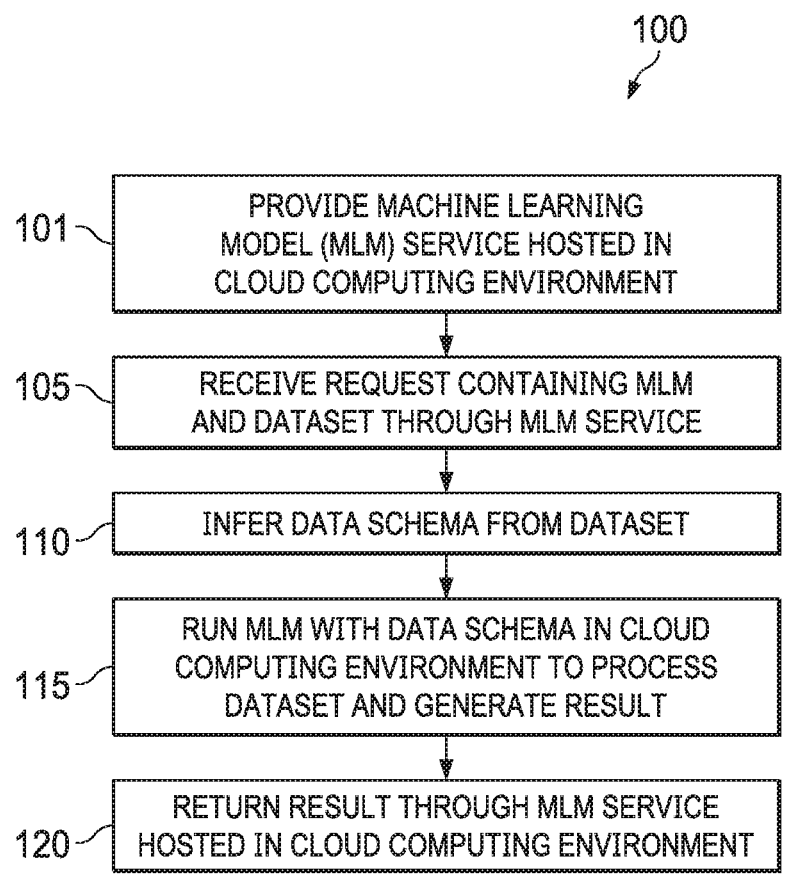
FIG. 1 depicts a flow chart illustrating an example of a method for providing a MLM service according to some embodiments.

Embodiments disclosed herein provide a new and viable alternative to the server-side-persistence approach taken by today's AI platforms for MLM consumption of data and generation of prediction. The new approach is stateless, lightweight, and cloud-based, and does not require persistence of an MLM on an AI platform. FIG. 1 depicts a flow chart that illustrates an example of a method 100 that implements this new approach.

In some embodiments, a MLM service hosted in a cloud computing environment can be provided to client systems for stateless MLM consumption of data and generation of prediction (101). A "cloud computing environment" can refer to an on-demand environment where computer system resources, particularly data storage and computational powers, can be utilized in a distributed manner. Physically, these computer resources reside in data centers that can be geographically remote from one another.

In some embodiments, the MLM service can be developed as a microservice on a microservice framework. Microservices are a variant of the service-oriented architecture (SOA). Unlike the SOA, microservices can operate and be deployed independently of other services and the protocols are lightweight. A microservice is significantly smaller than a service built on the SOA.

Many microservice frameworks (e.g., SPARK framework, SPRING framework, etc.) can be used to develop the MLM service. Java is an example language that can be used to develop the MLM service on a microservice framework. As a non-limiting example, the MLM service can be built in Java on the SPRING platform using a utility called SPRING BOOT. Microservice programming techniques and tools are known to those skilled in the art and thus are not further described herein. Skilled artisans understand that the microservice framework provides infrastructural support for developing and running various microservices, including the MLM service. The unique functionality of the MLM service and examples of the technical effects and advantages provided by the lightweight, cloud-based MLM service are further described below.

In some embodiments, the MLM service can receive a request from a client system to run an already trained MLM on some new data that the MLM has not seen before (105). Based on this request, the MLM service makes an API call to a designated REST API on an AI platform. The API call contains the trained MLM and the new data. However, the API call does not contain a data schema needed to process the new data. Accordingly, a data schema is inferred from the new data (110). The trained MLM is then run on the AI platform to process the new data utilizing the data schema. Based on its learned knowledge, the trained MLM then generates a result (e.g., a prediction) based on the new data (115). The result is returned to the client system by the MLM service (120).

Figure 2A:
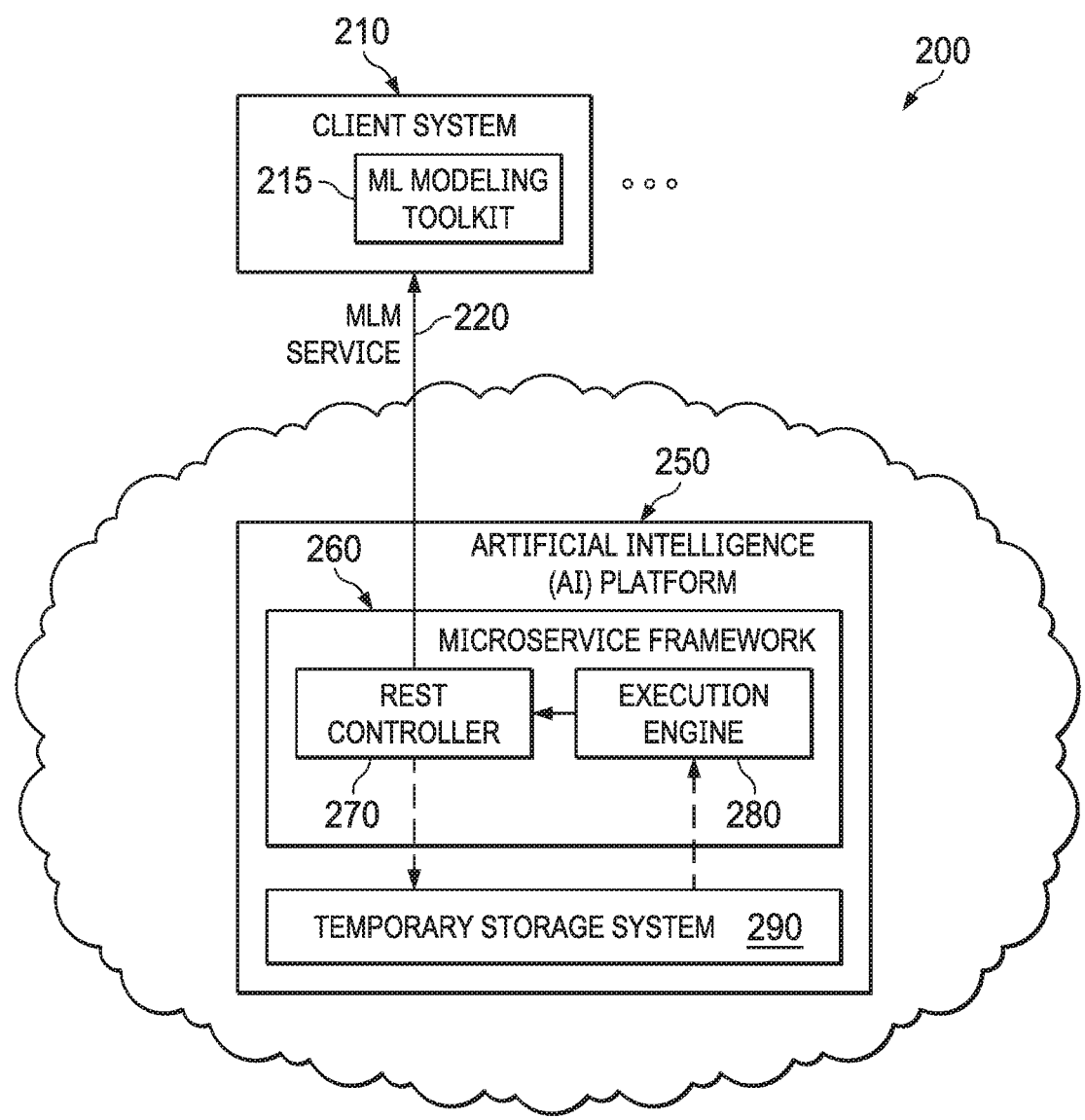
FIG. 2A depicts a diagrammatic representation of an example network computing environment where embodiments of a MLM service disclosed herein can be implemented.

In some embodiments, method 100 described above can be implemented in an example network computing environment 200 shown in FIG. 2A. In this example, an MLM service 220 is supported by microservice framework 260, hosted on AI platform 250, and provided to a client system 210. A user (e.g., a data scientist, an MLM developer, etc.) of client system 210 may build an MLM using a ML modeling toolkit 215. ML modeling toolkit 215 can include a ML library suitable for building the MLM in a manner known to those skilled in the art.

In some embodiments, microservice framework 260 can include a REST controller 270 and an execution engine 280. In some embodiments, REST controller 270 can be a REST application which offers an endpoint for HTTP methods to use an API of AI platform 250. Further, REST controller 270 can act as an interface (i.e., a REST API) for client systems to utilize resources such as libraries of AI platform 250. As a non-limiting example, AI platform 250 can implement a distributed cluster-computing framework known as the APACHE SPARK (i.e., the "SPARK framework"). In such cases, REST controller 270 can function as a SPARK API and client system and utilize SPARK libraries by interacting with the SPARK API.

It should be noted that not all AI platforms are suitable for hosting MLM service 220 in a cloud computing environment. As described above, some AI platforms will require the use of custom ML services packages and/or persistence of MLMs.

Further, an MLM can have many parts that need to be arranged together for the MLM to execute and produce results. For example, raw data would need to be preprocessed and/or converted to training data usable by an ML algorithm, the ML algorithm would need to be trained using the training data, and the output from the ML algorithm would need to be post-processed into an actionable result in the real world. The process of tying these parts together is known as a ML pipeline or pipeline. Enterprises that use the SPARK framework to develop their MLMs (e.g., through ML pipelines) can have a difficult time deploying the MLMs thus created (which can be referred to as data pipeline models) to production API services. The difficulties can stem from a desire not to use Python in an enterprise's API stack and/or a desire not to use a cloud-based AI platform.

Accordingly, an AI platform suitable for hosting MLM service 220 in a cloud computing environment can have an execution engine that can be configured to provide a runtime environment for execution of data pipeline models without requiring any custom service package or model persistence on the server side. Programmatically, the execution engine is operable to serialize a data pipeline model into a bundle of files (in a portable file format such as PROTOBUF or JSON), load the serialized bundle at runtime, and score against the bundle (i.e., the serialized data pipeline model) in the scoring environment in real time. Other serialization framework for serializing structured data can also be used. As a non-limiting example, execution engine 280 can implement a common serialization format and execution engine known as MLEAP.

Figure 2B:
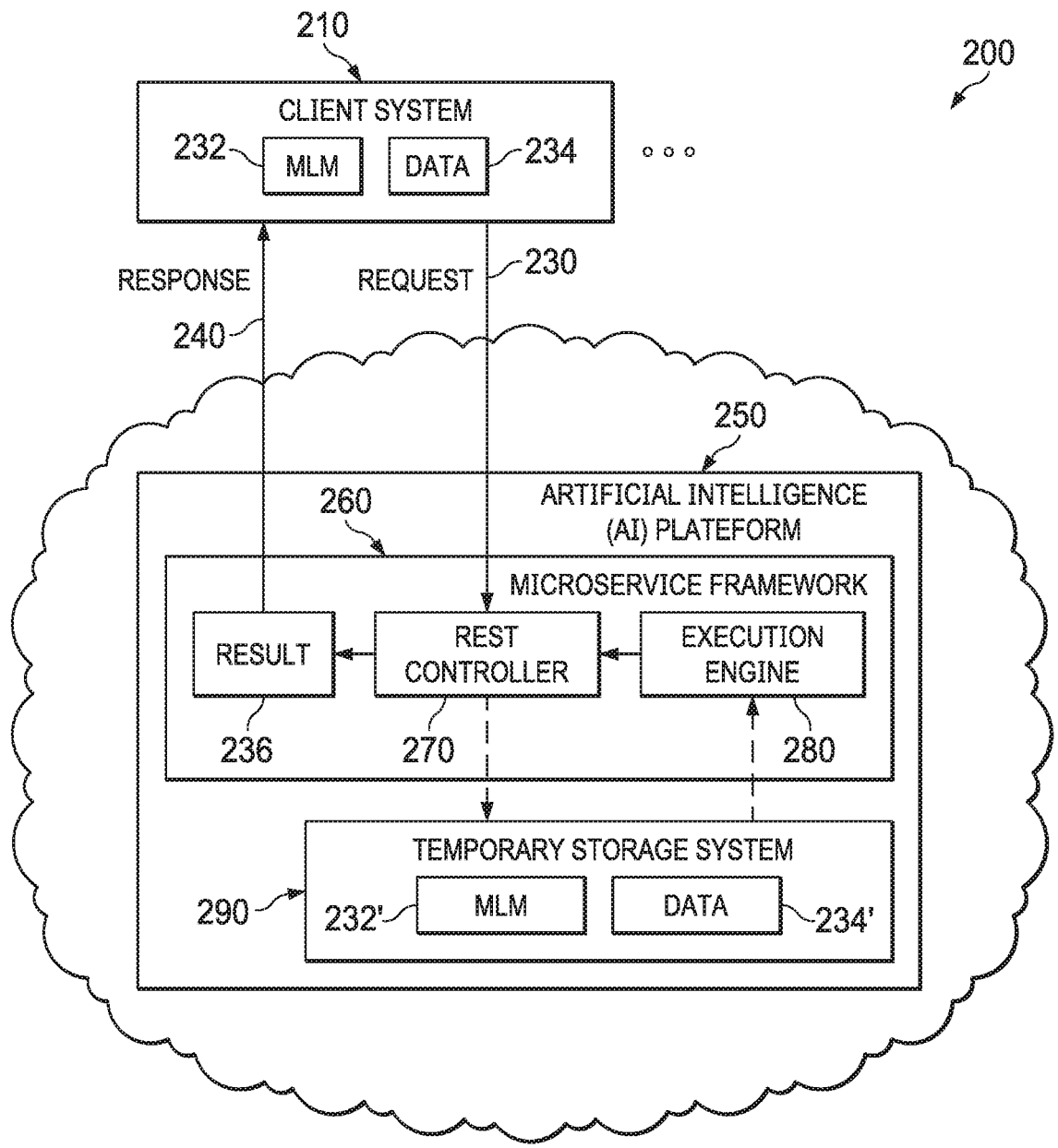
FIG. 2B depicts a diagrammatic representation of the example network computing environment shown in FIG. 2A with additional details according to some embodiments.

FIG. 2B shows more details on a request 230 received by MLM service 220 and a response 240 returned by MLM service 220. As shown in FIG. 2B, a MLM 232 and data 234 (to be processed by MLM 232) may reside on client system 210. In response to request 230, MLM service 220 can make an API call containing MLM 232 and data 234 to REST controller 270.

Optionally, MLM 232 and data 234 can be temporarily stored in a temporary storage system 290 as MLM 232' and data 234'. As a non-limiting example, temporary storage system 290 can be a temporary file system implemented on a cloud-based file system storage that supports the Network File System (NFS) protocol such as NFS/S3. As another example, temporary storage system 290 can be an in-memory storage. The in-memory implementation can be useful for security reasons, for instance, when MLM 232 and/or data 234 cannot be persisted outside client system 210 without encryption.

As a non-limiting example, MLM 232 can be a data pipeline model. Accordingly, execution engine 280 can serialize the data pipeline model into a bundle, load the serialized data pipeline model into a runtime environment, and score against the serialized data pipeline model in real time (e.g., in microseconds). This produces a result 236, which is then returned by MLM 232 in response 240.

In some embodiments, an MLM may already reside on an AI platform which hosts the MLM service disclosed herein. In such a case, previously, the MLM would be delivered or published directly to a consuming application and not to an API of the AI platform. With the MLM service, the MLM is delivered or published as part of an API call to a designated API of the AI platform. The MLM and the data are uploaded through the MLM service to the designated API of the AI platform and the MLM is applied live to the data by an execution engine of the AI platform, allowing for stateless MLM consumption of data and generation of MLM prediction. As a non-limiting example, the designated API can be a SPARK API and the engine can be an MLEAP engine.

In some embodiments, data 234 can be in any suitable file format, including the JSON file format, the CSV file format, etc. Other file formats are also possible. Data 234 can contain new data that MLM 232 has not processed before. In some embodiments, data 234 can contain tabular data stored in a delimited text file that uses a comma to separate values. Each line in the file is a data record consisting of one or more fields, separated by commas. As a non-limiting example, table 1 below provides an example of tabular data.

TABLE 1

| mpg | cylinders | displacement | horsepower | weight | acceleration | modelyear | name |
|---|---|---|---|---|---|---|---|
| 118 | 8 | 307 | 130 | 3504 | 12 | 70 | car maker 1 |
| 115 | 8 | 350 | 165 | 3693 | 11.5 | 70 | car maker 2 |
| 118 | 8 | 318 | 150 | 3436 | 11 | 70 | car maker 3 |
| 16 | 8 | 304 | 150 | 3433 | 12 | 70 | car maker 3 |
| 17 | 8 | 302 | 140 | 3449 | 10.5 | 70 | car maker 4 |
| 15 | 8 | 429 | 198 | 4341 | 10 | 70 | car maker 5 |
| 14 | 8 | 454 | 220 | 4354 | 9 | 70 | car maker 6 |
| 14 | 8 | 440 | 215 | 4312 | 8.5 | 70 | car maker 7 |
| 14 | 8 | 455 | 225 | 4425 | 10 | 70 | car maker 8 |
| 15 | 8 | 390 | 190 | 3850 | 8.5 | 70 | car maker 9 |

For the sake of brevity, table 1 shows 9 records in the example above. However, there can be hundreds of records (datasets) contained in data 234. Datasets in the range of 100 to 1000 rows per request can be processed on the fly in response to one request. Larger amounts of data (e.g., more than 1000 records) can be divided into chunks and the chunks of data can be uploaded with the same MLM through the MLM service in the same way as described above with no delay issues. Instead of a single result, multiple results would be returned by the MLM service.

As described above, an execution engine of the AI platform is operable to infer, from data 234, a data schema for MLM 232. In some embodiments, this can be accomplished by constructing a dataframe with named columns from data 234. A dataframe is a distributed collection of data organized into named columns that provides operations to filter, group, or compute aggregates. The AI platform already has the ability to construct dataframes from structure data files. Leveraging this ability, the execution engine can get the named columns of the dataframe constructed from data 234 and, from the named columns of the dataframe, the execution engine can create a structured description (i.e., a data schema) of what is contained in the dataset (e.g., eight columns and names of the column headers) and how data is organized in the dataset (e.g., the order of the names of the column headers).

As discussed above, the processing framework (e.g., the SPARK framework) does not store any MLMs. Instead, developers and data scientists alike can upload their developed and trained MLMs and data and get responses. The MLMs are executed on an AI platform on the fly, in a stateless manner. The footprint on the AI platform side is very minimal—just the execution engine and the time it takes to execute an MLM. Since the MLM is not persisted on the AI platform, and it is easy to scale API calls to the AI platform, the MLM service allows for easy scalability of executing MLMs in a cloud computing environment. If desired, a storage service could be provided to store the MLM in the cloud computing environment so that the MLM is reusable. However, that is not required and there is no need to increase the storage capacity of the AI platform to scale up the MLM service. An example of an AI platform will now be described with reference to FIG. 3.

Figure 3:
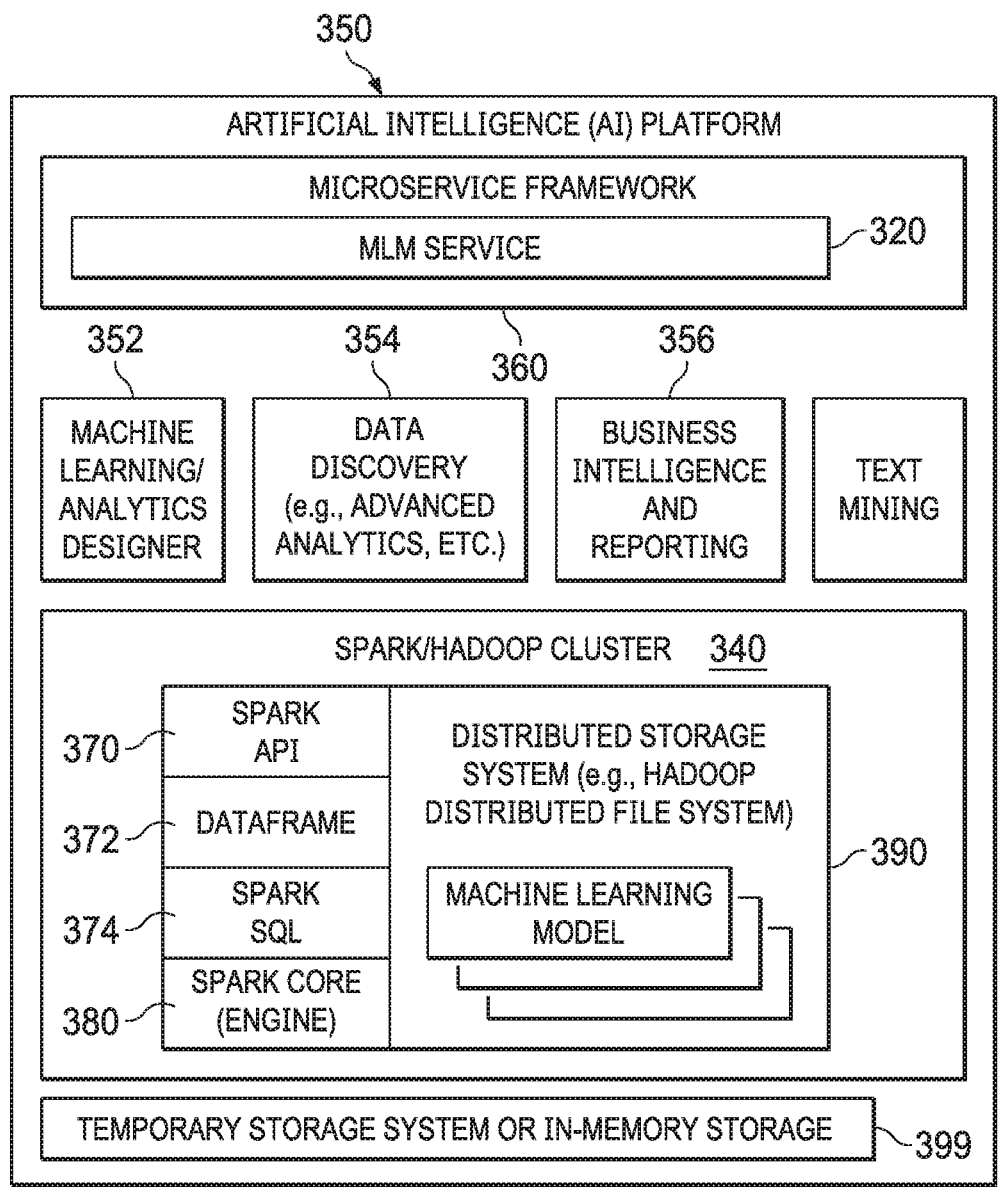
FIG. 3 depicts a diagrammatic representation of an example of an AI platform on which a MLM service disclosed herein can be implemented according to some embodiments.

FIG. 3 depicts a diagrammatic representation of an example of an AI platform 350 on which a MLM service disclosed herein can be implemented according to some embodiments. In this example, AI platform 350 includes a microservice framework 360. In some embodiments, microservice framework 360 can implement microservice framework 260 described above. Similar to AI platform 250, AI platform 350 can be communicatively connected to various client systems over a network. All or a portion of AI platform 350 can be hosted in a cloud computing environment.

In the example of FIG. 3, AI platform 350 includes a distributed cluster-computing framework 340 (e.g., a SPARK/HADOOP cluster). In distributed cluster-computing framework 340, a dataset is a distributed collection of data. A dataframe represents a two-dimensional data structure for organizing a dataset into named columns. Conceptually, a dataframe is similar to a table in a relational database or a data frame in R/Python, but with richer optimization. A dataframe could have different columns storing text, feature vectors, true labels, and predictions. Structured data inside SPARK programs can be queried using a SPARK SQL 374 or a SPARK API 370.

Functionalities of AI platform 350 are built on top of an execution engine (SPARK core 380). SPARK core 380 provides in-memory computing capabilities to deliver speed, a generalized execution model to support a wide variety of applications, and Java, Scala, and Python APIs for ease of development.

A client system of AI platform 350 can be a data scientist or developer's computer, which can be a user device or a server machine. An MLM can be developed and reside on a client system, as shown in FIGS. 2A-2B, or it can be developed and reside on an AI platform, as shown in FIG. 3 (e.g., developed through a machine learning/analytics designer environment 352 and stored in a distributed storage system 390). As a non-limiting example, a data discovery system 354 or a business intelligence and reporting system 356 can be a target system that consumes outcome produced by MLMs. Such a target system operates in a production environment. Previously, when a user of a target system wants to use a published MLM, the target system can provide a path to a repository location where the published MLM is stored and information on the attributes required by the published MLM to run. Different users of the target system can use the same published MLM for different data discovery and/or analysis purposes.

As a non-limiting example, suppose there is a need for an enterprise to predict when a loyal customer might leave. A data scientist can get historical data on customer churning (e.g., a churn rate which measures the number of customers leaving the enterprise) in the past and also get data on current customers. The data scientist can write code to analyze the data (e.g., by comparing continuing customers versus leaving customers) to determine which customer is likely to become a churner. The data scientist can use this code to "train" a machine and create a "churn model" that can then be used to apply to real-life instances, such as in the field during a customer phone call, so that the machine can predict, while the customer is on the call, whether the customer might become a churner and, if so, what appropriate action can be taken accordingly.

The machine can "learn" based on the churn model to classify customers into "churner" or "not churner." When the data scientist is satisfied with the machine's performance, the churn model can be published to the data discovery system. The churn model then becomes available through the data discovery system and accessible by an authorized user (e.g., another data scientist or a data analyst through a data discovery administrative interface running on a client device). The user of the data discovery system can use the churn model to determine "churners" and decisions can be made based on the predictions from the churn model (e.g., initiating a marketing campaign to try to deter churning). Through the data discovery system, the same published churn model can be used in various practical applications.

However, as described above, this server-side-persistence approach does not allow the use of an MLM that is not developed or persisted on AI platform 350. Further, since the MLMs persist on AI platform 350, to scale up, the capacity of distributed storage system 390 would need to be increased.

The invention disclosed herein can address these and other drawbacks of the server-side-persistence approach by providing a stateless, lightweight, and cloud-based MLM service. As described above and shown in FIG. 3, a MLM service 320 has infrastructural support from microservice framework 360 and is configured to interact with a designated REST API (e.g., a SPARK API 370). With MLM service 320, a user can upload an MLM and data to be processed by the MLM in a single request and promptly gets a result (e.g., a prediction) back. The MLM does not need to be developed or persisted on AI platform 350. This provides the flexibility for users of AI platform 350 to choose ML development environments, modeling tools, frameworks, pipelines, etc. as they so desire. Further, AI platform 350 does not need to store the MLMs that its users want to run on AI platform 350. This has a technical effect of eliminating the need to scale up the capacity of distributed storage system 390 as the demand increases. Indeed, because MLM service 320 is very light weight, it does not need the complex architecture and processing power of distributed cluster-computing framework 340 (e.g., a SPARK/HADOOP cluster). Instead, only SPARK core 380 (in local mode) is needed. As alluded to above, SPARK core 380 provides in-memory computing capabilities. Optionally, an in-memory storage 399 may be used to temporarily store a client-provided MLM and data being processed. Further, since the MLM is stateless, the state synchronization logic can be eliminated on the server side. This has a technical effect of reducing the complexity of running MLMs on AI platform 350.

As a non-limiting example of implementation, an MLM can be built using a SPARK-based ML pipeline. SPARK is widely used for performing large-scale data processing and ML computations. A SPARK-based ML pipeline provides a uniform set of high-level APIs built on top of dataframes that help users create and tune practical MLMs.

SPARK's ML library "MLlib" is an example of a ML software library that can be integrated with an AI platform. MLlib provides standardized APIs for ML algorithms. For example, MLlib supports MLM persistence through a dataframe-based API 372, which provides functionality for saving and loading MLMs to AI platform 350 for persistence. As described above, MLM service 320 provides a stateless alternative to this approach.

Through the standardized APIs for ML algorithms, a ML pipeline can chain multiple ML algorithms together to specify a ML workflow (e.g., for training or testing). Examples of ML algorithms that can be chained in a ML pipeline can include transformers and estimators. A transformer is an algorithm which can transform one dataframe into another dataframe. For instance, an MLM can be a transformer which transforms a dataframe with features into a dataframe with predictions. An estimator is an algorithm which can be fit on a dataframe to produce a transformer. For instance, a learning algorithm can be an estimator which trains on a dataframe and produces a model. These transforms and estimators can share a common API for specifying parameters. Building MLMs using a SPARK-based ML pipeline is known to those skilled in the art and thus is not further described herein. Details and examples of how to build SPARK ML pipeline models can be found, for instance, from the Apache Software Foundation at spark.apache.org.

Figure 4A:
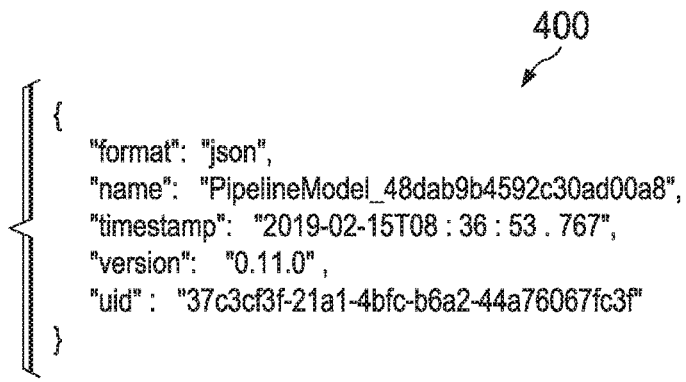
FIG. 4A is an example of a MLM according to some embodiments.

In practice, ML workflows include many stages, from feature extraction and transformation to model fitting and tuning. As an example, a ML pipeline can consist of string indexing a set of categorical features, followed by one hot encoding them, assembling the results into a feature vector, and, finally, executing a linear regression on the features. A described above, such a ML pipeline can be serialized into a bundle. The bundle has a structure that includes, in its root directory, a bundle file (e.g., a JSON file) which provides metadata about the serialization of the bundle. An example of a bundle file 400 is shown in FIG. 4A. In this case, bundle file 400 describes a serialization format "format" utilized to serialize this bundle, a unique identifier "name" for a root transformer, a timestamp "timestamp" defining when the bundle was serialized, and a Java universal unique identifier "uid" automatically generated as a unique identifier for the bundle.

Figure 4B:
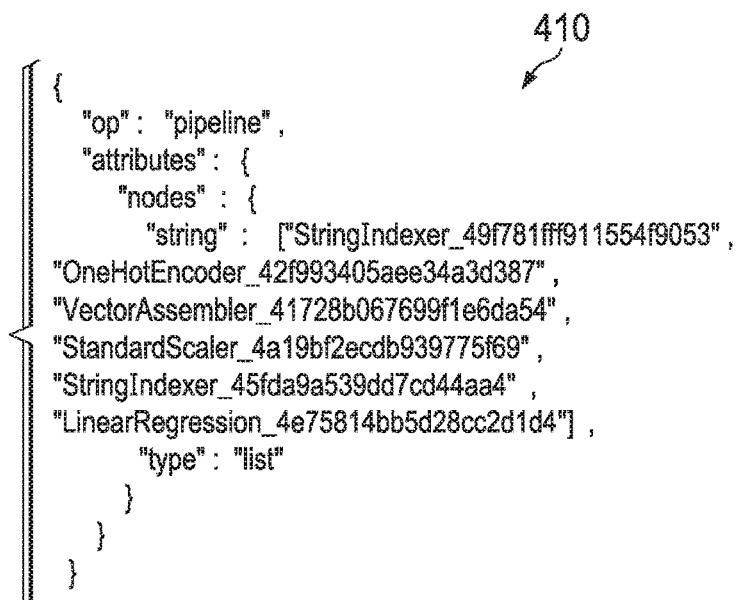
FIG. 4B is an example of a node on which the MLM of FIG. 4A can be run.
Figure 4C:
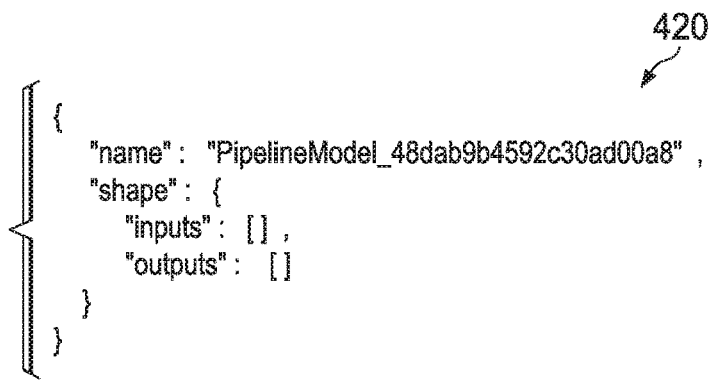
FIG. 4C shows an example of a node.

In the root subdirectory, along with the bundle file, is a subdirectory "root" which contains the root transformer of the ML pipeline (e.g., a pipeline transformer). For example, the root subdirectory can contain a model for the ML pipeline and a node for the one hot encoder. FIG. 4B shows an example of a model 410 as a JSON file (e.g., model.json) and FIG. 4C shows an example of a node 420 as a JSON file (e.g., node.json). Model file 410 can include each stage defined in the workflow of the ML pipeline, including everything in the transformation stage and information needed during the usage of the model. For example, "op"

specifies the operation to be executed and "attributes" contains the values needed by the operation in order to execute. Likewise, node file 420 can specify (by "name") the name of the node in an execution graph and specify (by "shape") the inputs and outputs of the node and how they are to be used by the operation. In this example, the root subdirectory can include further subdirectories, one for each stage in the ML pipeline (e.g., two string indexer subdirectories, a one hot encoder subdirectory, a vector assembler subdirectory, a standard scaler subdirectory, and a linear regression subdirectory). Each subdirectory contains a model and a node. For example, the linear regression subdirectory can contain a model JSON file specifying the operation to be executed as "linear_regression" and the values needed by "linear_regression" to execute properly. The linear regression subdirectory can further contain a node JSON file specifying (by "name") the name of the node in an execution graph and specifying (by "shape") the inputs (e.g., "port": "features", "name": "scaledFeatures") and outputs ("port": "prediction", "name": "prediction") of the node and how they are to be use by the operation.

As described above, this serialization can be performed using the MLEAP framework. Other serialization framework can also be used. Those skilled in the art can appreciate that implementation details can vary from implementation to implementation. Thus, examples described above are for illustrative purposes and are not meant to be limiting.

Embodiments disclosed herein can provide many advantages. For example, since the MLM service is stateless, it can easily be scaled up in a cloud computing environment. Further, since persistent deployment to a target system is not required, a MLM can be readily applied whenever desired and yet can still leverage the computational power of an AI platform to obtain a result in a speedy manner. The MLM service disclosed herein can reduce complexities on the client side as well as the server side. For instance, once an MLM is trained, a user can make a request to run the MLM on some data and the MLM service can take care of the rest of necessary actions to run the MLM on an AI platform, obtain a result, and return the result in a timely manner. The complexity on the server side is also reduced because no session information or state synchronization logic is needed and no persistence of the MLM and/or the data is necessary. This allows the MLM service to be scaled up without requiring an increase in the storage capability of the AI platform.

Figure 5:
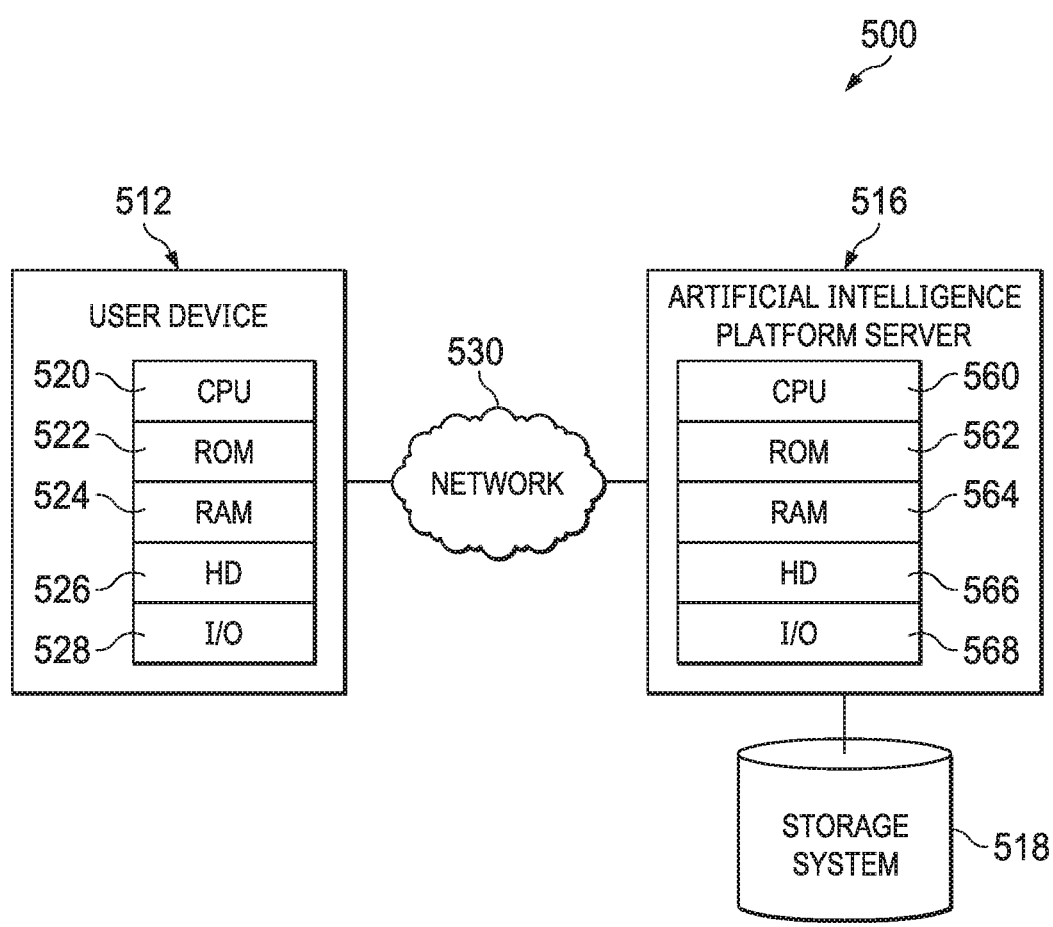
FIG. 5 depicts a diagrammatic representation of a distributed network computing environment where embodiments disclosed can be implemented.

Embodiments disclosed herein can be implemented in many ways. FIG. 5 depicts a diagrammatic representation of a distributed network computing environment where embodiments disclosed can be implemented. In the example of FIG. 5, network computing environment 500 may include network 530 that can be bi-directionally coupled to user computer 512 and AI platform server 516 which, in this example, is communicatively connected to distributed storage system 518. Network 530 may represent a combination of wired and wireless networks that network computing environment 500 may utilize for various types of network communications known to those skilled in the art.

For the purpose of illustration, a single system is shown for each of user computer 512 and AI platform server 516. However, within each of user computer 512 and AI platform server 516, a plurality of computers (not shown) may be interconnected to each other over network 530. For example, a plurality of user computers may be communicatively connected over network 530 to one or more AI platform servers.

User computers 512 may include a data processing system for communicating with AI platform server 516. User computer 512 can include central processing unit ("CPU") 520, read-only memory ("ROM") 522, random access memory ("RAM") 524, hard drive ("HD") or storage memory 526, and input/output device(s) ("I/O") 528. I/O 528 can include a keyboard, monitor, printer, electronic pointing device (e.g., mouse, trackball, stylus, etc.), or the like. User computer 512 can include a desktop computer, a laptop computer, a personal digital assistant, a cellular phone, or nearly any device capable of communicating over a network. AI platform server 516 may include CPU 560, ROM 562, RAM 564, HD 566, and I/O 568. Many other alternative configurations are possible and known to skilled artisans.

Each of the computers in FIG. 5 may have more than one CPU, ROM, RAM, HD, I/O, or other hardware components. For the sake of brevity, each computer is illustrated as having one of each of the hardware components, even if more than one is used. Each of computers 512 and 516 is an example of a data processing system. ROM 522 and 562; RAM 524 and 564; HD 526 and 566; and storage system 518 can include media that can be read by CPU 520 and/or 560. Therefore, these types of memories include non-transitory computer-readable storage media. These memories may be internal or external to computers 512 or 516.

Portions of the methods described herein may be implemented in suitable software code that may reside within ROM 522 or 562; RAM 524 or 564; or HD 526 or 566. In addition to those types of memories, the instructions in an embodiment disclosed herein may be contained on a data storage device with a different computer-readable storage medium, such as a hard disk. Alternatively, the instructions may be stored as software code elements on a data storage array, magnetic tape, floppy diskette, optical storage device, or other appropriate data processing system readable medium or storage device.

Those skilled in the relevant art will appreciate that the invention can be implemented or practiced with other computer system configurations, including without limitation multi-processor systems, network devices, mini-computers, mainframe computers, data processors, and the like. The invention can be embodied in a computer, or a special purpose computer or data processor that is specifically programmed, configured, or constructed to perform the functions described in detail herein. The invention can also be employed in distributed computing environments, where tasks or modules are performed by remote processing devices, which are linked through a communications network such as a local area network (LAN), wide area network (WAN), and/or the Internet. In a distributed computing environment, program modules or subroutines may be located in both local and remote memory storage devices. These program modules or subroutines may, for example, be stored or distributed on computer-readable media, including magnetic and optically readable and removable computer discs, stored as firmware in chips, as well as distributed electronically over the Internet or over other networks (including wireless networks). Example chips may include Electrically Erasable Programmable Read-Only Memory (EEPROM) chips. Embodiments discussed herein can be implemented in suitable instructions that may reside on a non-transitory computer readable medium, hardware circuitry or the like, or any combination and that may be translatable by one or more server machines. Examples of a non-transitory computer readable medium are provided below in this disclosure.

As is known to those skilled in the art, a suitable computer system can include a CPU, a ROM, a RAM, a HD, and I/O device(s). The I/O devices can include a keyboard, monitor, printer, electronic pointing device (for example, mouse, trackball, stylus, touch pad, etc.), or the like. ROM, RAM, and HD are non-transitory computer memories for storing computer-executable instructions executable by the CPU or capable of being compiled or interpreted to be executable by the CPU.

Suitable computer-executable instructions may reside on a non-transitory computer readable medium (e.g., ROM, RAM, and/or HD), hardware circuitry or the like, or any combination thereof. Within this disclosure, the term "non-transitory computer readable medium" is not limited to ROM, RAM, and HD and can include any type of data storage medium that can be read by a processor. Examples of non-transitory computer-readable storage media can include, but are not limited to, volatile and non-volatile computer memories and storage devices such as random access memories, read-only memories, hard drives, data cartridges, direct access storage device arrays, magnetic tapes, floppy diskettes, flash memory drives, optical data storage devices, compact-disc read-only memories, and other appropriate computer memories and data storage devices. Thus, a computer-readable medium may refer to a data cartridge, a data backup magnetic tape, a floppy diskette, a flash memory drive, an optical data storage drive, a CD-ROM, ROM, RAM, HD, or the like.

The processes described herein may be implemented in suitable computer-executable instructions that may reside on a computer readable medium (for example, a disk, CD-ROM, a memory, etc.). Alternatively, the computer-executable instructions may be stored as software code components on a direct access storage device array, magnetic tape, floppy diskette, optical storage device, or other appropriate computer-readable medium or storage device.

Any suitable programming language can be used to implement the routines, methods or programs of embodiments of the invention described herein, including C, C++, Java, JavaScript, HTML, or any other programming or scripting code, etc. Other software/hardware/network architectures may be used. For example, the functions of the disclosed embodiments may be implemented on one computer or shared/distributed among two or more computers in or across a network. Communications between computers implementing embodiments can be accomplished using any electronic, optical, radio frequency signals, or other suitable methods and tools of communication in compliance with known network protocols.

Different programming techniques can be employed such as procedural or object oriented. Any particular routine can execute on a single computer processing device or multiple computer processing devices, a single computer processor or multiple computer processors. Data may be stored in a single storage medium or distributed through multiple storage mediums, and may reside in a single database or multiple databases (or other data storage techniques). Although the steps, operations, or computations may be presented in a specific order, this order may be changed in different embodiments. In some embodiments, to the extent multiple steps are shown as sequential in this specification, some combination of such steps in alternative embodiments may be performed at the same time. The sequence of operations described herein can be interrupted, suspended, or otherwise controlled by another process, such as an operating system, kernel, etc. The routines can operate in an operating system environment or as stand-alone routines. Functions, routines, methods, steps, and operations described herein can be performed in hardware, software, firmware or any combination thereof.

Embodiments described herein can be implemented in the form of control logic in software or hardware or a combination of both. The control logic may be stored in an information storage medium, such as a computer-readable medium, as a plurality of instructions adapted to direct an information processing device to perform a set of steps disclosed in the various embodiments. Based on the disclosure and teachings provided herein, a person of ordinary skill in the art will appreciate other ways and/or methods to implement the invention.

It is also within the spirit and scope of the invention to implement in software programming or code an of the steps, operations, methods, routines or portions thereof described herein, where such software programming or code can be stored in a computer-readable medium and can be operated on by a processor to permit a computer to perform any of the steps, operations, methods, routines or portions thereof described herein. The invention may be implemented by using software programming or code in one or more digital computers, by using application specific integrated circuits, programmable logic devices, field programmable gate arrays, optical, chemical, biological, quantum or nano-engineered systems, components, and mechanisms may be used. In general, the functions of the invention can be achieved by any means as is known in the art. For example, distributed, or networked systems, components, and circuits can be used. In another example, communication or transfer (or otherwise moving from one place to another) of data may be wired, wireless, or by any other means.

A "computer-readable medium" may be any medium that can contain, store, communicate, propagate, or transport the program for use by or in connection with the instruction execution system, apparatus, system, or device. The computer readable medium can be, by way of example only but not by limitation, an electronic, magnetic, optical, electromagnetic, infrared, or semiconductor system, apparatus, system, device, propagation medium, or computer memory. Such computer-readable medium shall generally be machine readable and include software programming or code that can be human readable (e.g., source code) or machine readable (e.g., object code). Examples of non-transitory computer-readable media can include random access memories, read-only memories, hard drives, data cartridges, magnetic tapes, floppy diskettes, flash memory drives, optical data storage devices, compact-disc read-only memories, and other appropriate computer memories and data storage devices. In an illustrative embodiment, some or all of the software components may reside on a single server computer or on any combination of separate server computers. As one skilled in the art can appreciate, a computer program product implementing an embodiment disclosed herein may comprise one or more non-transitory computer readable media storing computer instructions translatable by one or more processors in a computing environment.

A "processor" includes any hardware system, mechanism or component that processes data, signals or other information. A processor can include a system with a central processing unit, multiple processing units, dedicated circuitry for achieving functionality, or other systems. Processing need not be limited to a geographic location, or have temporal limitations. For example, a processor can perform its functions in "real-time," "offline," in a "batch mode," etc.

Portions of processing can be performed at different times and at different locations, by different (or the same) processing systems.

As used herein, the terms "comprises," "comprising," "includes," "including," "has," "having," or any other variation thereof, are intended to cover a non-exclusive inclusion. For example, a process, product, article, or apparatus that comprises a list of elements is not necessarily limited to only those elements but may include other elements not expressly listed or inherent to such process, product, article, or apparatus.

Furthermore, the term "or" as used herein is generally intended to mean "and/or" unless otherwise indicated. For example, a condition A or B is satisfied by any one of the following: A is true (or present) and B is false (or not present), A is false (or not present) and B is true (or present), and both A and B are true (or present). As used herein, including the accompanying appendices, a term preceded by "a" or "an" (and "the" when antecedent basis is "a" or "an") includes both singular and plural of such term, unless clearly indicated otherwise (i.e., that the reference "a" or "an" clearly indicates only the singular or only the plural). Also, as used in the description herein and in the accompanying appendices, the meaning of "in" includes "in" and "on" unless the context clearly dictates otherwise.

Although the foregoing specification describes specific embodiments, numerous changes in the details of the embodiments disclosed herein and additional embodiments will be apparent to, and may be made by, persons of ordinary skill in the art having reference to this disclosure. In this context, the specification and figures are to be regarded in an illustrative rather than a restrictive sense, and all such modifications are intended to be included within the scope of this disclosure. The scope of the present disclosure should be determined by the following claims and their legal equivalents.

What is claimed is:

1. A method, comprising:
   receiving, from a client device by a machine learning model (MLM) service, a request to run a MLM with a dataset, the request containing the MLM and the dataset, wherein the MLM has been trained, the MLM service provided from a microservice framework that operates in a cloud computing environment, the microservice framework having an execution engine configured for serializing the MLM into a serialized form and providing a runtime environment for execution of the MLM in the serialized form;
   inferring, by the execution engine from the dataset contained in the request, a data schema required to run the MLM, the data schema comprising a structured description of what is contained in the dataset and how data is organized in the dataset;
   running, by the execution engine utilizing the data schema, the MLM in the cloud computing environment to process the dataset and generate a prediction; and
   in response to the request, returning, by the MLM service, the prediction generated in the cloud computing environment to the client device.

2. The method according to claim 1, wherein the dataset consists of comma separated values.

3. The method according to claim 1, further comprising:
   constructing, from the dataset, a dataframe with named columns, wherein the data schema is inferred from the named columns of the dataframe constructed from the dataset.

4. The method according to claim 1, wherein the request from the client device comprises an application programming interface (API) call and wherein the API call is received by a Representational State Transfer (REST) controller running on the microservice framework.

5. The method according to claim 1, wherein the MLM is structured to implement an ensemble learning method, a random forest classifier, a meta estimator, or a random decision forest.

6. The method according to claim 1, wherein running the MLM in the cloud computing environment comprises temporarily storing the MLM in a temporary storage system in the cloud computing environment.

7. The method according to claim 1, wherein neither the MLM nor the dataset is persisted in the cloud computing environment.

8. A system, comprising:
   a processor;
   a non-transitory computer-readable medium; and
   stored instructions translatable by the processor for:
      receiving, from a client device by a machine learning model (MLM) service, a request to run a MLM with a dataset, the request containing the MLM and the dataset, wherein the MLM has been trained, the MLM service provided from a microservice framework that operates in a cloud computing environment, the microservice framework having an execution engine configured for serializing the MLM into a serialized form and providing a runtime environment for execution of the MLM in the serialized form;
      inferring, from the dataset contained in the request, a data schema required to run the MLM, the data schema comprising a structured description of what is contained in the dataset and how data is organized in the dataset;
      running, by the execution engine utilizing the data schema, the MLM in the cloud computing environment to process the dataset and generate a prediction; and
      in response to the request, returning, by the MLM service, the prediction generated in the cloud computing environment to the client device.

9. The system of claim 8, wherein the dataset consists of comma separated values.

10. The system of claim 8, wherein the stored instructions are further translatable by the processor for:
    constructing, from the dataset, a dataframe with named columns, wherein the data schema is inferred from the named columns of the dataframe constructed from the dataset.

11. The system of claim 8, wherein the request from the client device comprises an application programming interface (API) call and wherein the API call is received by a Representational State Transfer (REST) controller running on the microservice framework.

12. The system of claim 8, wherein the MLM is structured to implement an ensemble learning method, a random forest classifier, a meta estimator, or a random decision forest.

13. The system of claim 8, wherein running the MLM in the cloud computing environment comprises temporarily storing the MLM in a temporary storage system in the cloud computing environment.

14. The system of claim 8, wherein neither the MLM nor the dataset is persisted in the cloud computing environment.

15. A computer program product comprising a non-transitory computer-readable medium storing instructions translatable by a processor for:

receiving, from a client device by a machine learning model (MLM) service, a request to run a MLM with a dataset, the request containing the MLM and the dataset, wherein the MLM has been trained, the MLM service provided from a microservice framework that operates in a cloud computing environment, serializing the MLM into a serialized form and providing a runtime environment for execution of the MLM in the serialized form;

inferring, by the execution engine from the dataset contained in the request, a data schema required to run the MLM, the data schema comprising a structured description of what is contained in the dataset and how data is organized in the dataset;

running, by the execution engine utilizing the data schema, the MLM in the cloud computing environment to process the dataset and generate a prediction; and in response to the request, returning, by the MLM service, the prediction generated in the cloud computing environment to the client device.

16. The computer program product of claim 15, wherein the dataset consists of comma separated values.

17. The computer program product of claim 15, wherein the instructions are further translatable by the processor for:

constructing, from the dataset, a dataframe with named columns, wherein the data schema is inferred from the named columns of the dataframe constructed from the dataset.

18. The computer program product of claim 15, wherein the request from the client device comprises an application programming interface (API) call and wherein the API call is received by a Representational State Transfer (REST) controller running on the microservice framework.

19. The computer program product of claim 15, wherein the MLM is structured to implement an ensemble learning method, a random forest classifier, a meta estimator, or a random decision forest.

20. The computer program product of claim 15, wherein running the MLM in the cloud computing environment comprises temporarily storing the MLM in a temporary storage system in the cloud computing environment.

* * * * *